(12) United States Patent
Tsai

(10) Patent No.: US 7,957,487 B1
(45) Date of Patent: Jun. 7, 2011

(54) SPURIOUS COMPONENT REDUCTION

(75) Inventor: King Chun Tsai, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 12/581,451

(22) Filed: Oct. 19, 2009

Related U.S. Application Data

(63) Continuation of application No. 10/829,801, filed on Apr. 21, 2004, now Pat. No. 7,613,249.

(51) Int. Cl.
*H04L 25/03* (2006.01)

(52) U.S. Cl. .................. 375/296; 375/285; 455/118

(58) Field of Classification Search .......... 375/285, 375/295, 296, 340, 350; 455/63.1, 67.11, 455/91, 118, 296, 306, 307
See application file for complete search history.

(56) References Cited

U.S. PATENT DOCUMENTS

| | | | |
|---|---|---|---|
| 3,559,042 A | 1/1971 | Gingell | |
| 4,352,210 A | 9/1982 | Puckette | |
| 4,545,072 A | 10/1985 | Skutta et al. | |
| 4,723,318 A | 2/1988 | Marshall | |
| 5,794,131 A | 8/1998 | Cairns | |
| 5,893,026 A | 4/1999 | Kim | |
| 5,903,232 A | 5/1999 | Zarubinsky et al. | |
| 6,236,847 B1 | 5/2001 | Stikvoort | |
| 6,831,506 B1 | 12/2004 | Moffat et al. | |
| 6,977,976 B1 * | 12/2005 | Birkett et al. | 375/345 |
| 7,212,581 B2 * | 5/2007 | Birkett et al. | 375/295 |
| 2002/0149421 A1 | 10/2002 | Waasen et al. | |
| 2003/0050030 A1 | 3/2003 | Hagberg et al. | |
| 2005/0075089 A1 | 4/2005 | Iida | |

OTHER PUBLICATIONS

Zagari et al., "A 5-GHz CMOS Transceiver for IEEE 802.11a Wireless LAN Systems", IEEE Journal of Solid-State Circuits, vol. 37, No. 12, Dec. 2002, pp. 1688-1694.

"Part 16: Air Interface for Fixed Broadband Wireless Access Systems", IEEE 802.16, IEEE Standard for Local and Metropolitan Area Networks, Oct. 1, 2004.

"Information technology—Telecommunications and information exchange between systems—Local and metropolitan area networks—Specific requirements—Part 11: Wireless LAN Medium Access Control (MAC) and Physical Layer (PHY) specifications", IEEE Std 802.11, 1999.

"Part II: Wireless LAN Medium Access Control (MAC) and Physical Layer (PHY) specifications: Higher-Speed Physical Layer Extension in the 2.4 GHz Band", IEEE Std. 802.11b, 1999.

"Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band", IEEE 802.11g, 2003.

"Part 11: Wireless LAN Medium Access Control (MAC) and Physical Layer (PHY) specifications: Amendment 6: Medium Access Control (MAC) Security Enhancements, " IEEE Std. 802.11i, 2004.

"TGn Sync Proposal Technical Specification", IEEE Std. 802.11n, 2005.

"Part 11: Wireless LAN Medium Access Control (MAC) and Physical Layer (PHY) specifications: Higher-Speed Physical Layer Extension in the 2.4 GHz Band", IEEE Std 802.11a, 1999.

\* cited by examiner

*Primary Examiner* — Dac V Ha

(57) ABSTRACT

Apparatus, systems, and methods implementing techniques for reducing spurious components are described. According to one aspect, a wideband polyphase filter filters an input signal that has an associated first frequency. The wideband polyphase filter has poles corresponding to a first filter frequency and a second filter frequency, where the two filter frequencies are different. According to another aspect, a mixer mixes the filtered signal with a local-oscillator signal at a second frequency to produce an upconverted signal, where the second frequency is substantially an integer multiple of the first frequency.

14 Claims, 4 Drawing Sheets

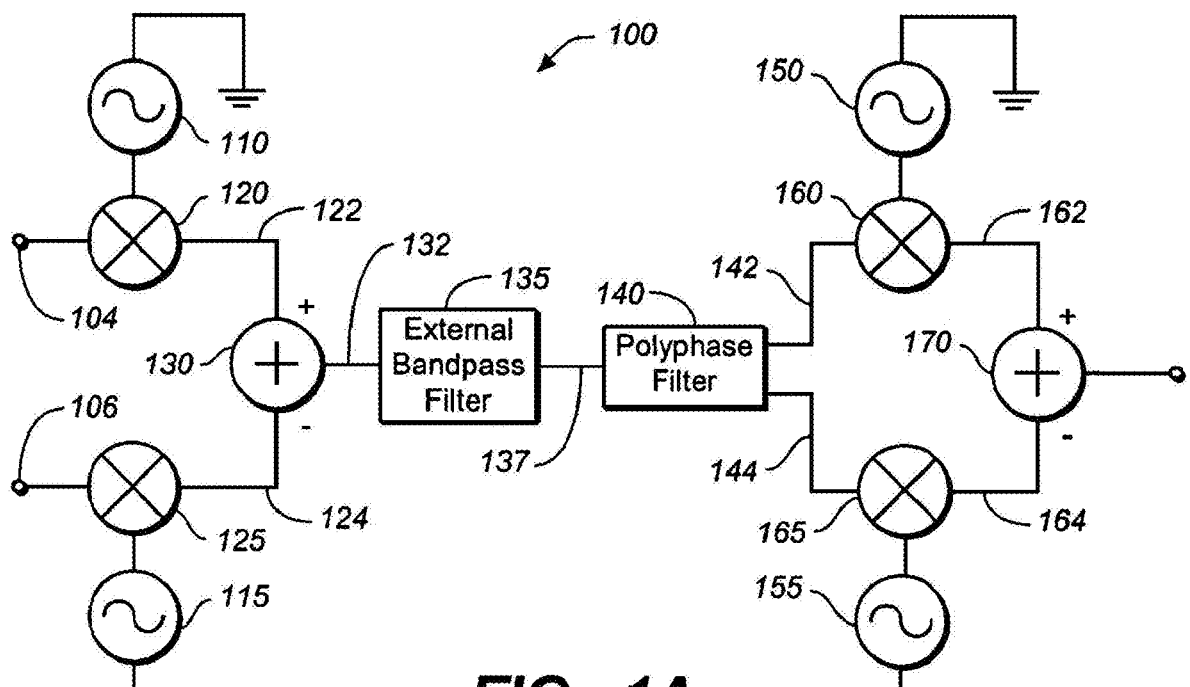
FIG._1A
*(PRIOR ART)*
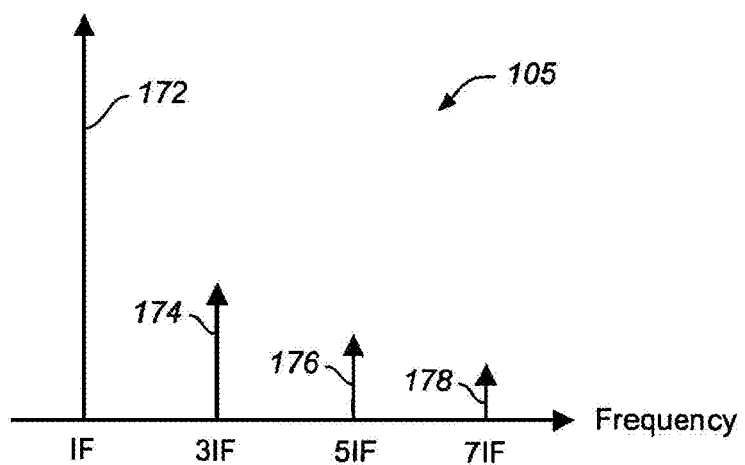
FIG._1B
*(PRIOR ART)*

SPURIOUS COMPONENT REDUCTION

RELATED APPLICATION

This application is a continuation of and claims the benefit of priority under 35 USC 120 to U.S. application Ser. No. 10/829,801, filed Apr. 21, 2004, now U.S. Pat. No. 7,613,249 the disclosure of which is incorporated herein by reference in its entirety.

BACKGROUND

The following disclosure relates to electrical circuits and signal processing.

A wireless communications transmitter typically converts an information-bearing baseband signal from around DC to a high frequency referred to as the carrier frequency (e.g., a frequency in the microwave or RF band) that is suitable for wireless transmission. In many systems, this frequency upconversion process takes place in multiple stages. The baseband signal is first upconverted to an intermediate frequency ($f_{IF}$) that is higher than the bandwidth of the baseband signal. At the intermediate frequency, the signal is amplified and filtered before the signal is upconverted to the carrier frequency ($f_c$) for transmission.

In an ideal transmitter, all transmitted signal energy is confined to a dedicated frequency channel, and no energy is emitted outside the channel to interfere with other wireless systems. In practical realizations, out-of-band spurious emissions often are generated by transmitters due to, for example, local-oscillator (LO) harmonics, image generation, and intermodulation.

Spurious emissions caused by the mechanisms mentioned above can fall into restricted frequency bands and result in an emissions violation. Conventional transceivers can use highly selective external filters (e.g., SAW filters) to suppress undesirable spurious emissions. External filters add to the overall cost and size of the transceiver.

SUMMARY

In one aspect, the invention features an apparatus including a wideband polyphase filter, which filters an input signal that has an associated first frequency. The wideband polyphase filter has poles corresponding to a first filter frequency and a second filter frequency, where the two filter frequencies are different. A mixer mixes the filtered signal with a local-oscillator signal at a second frequency to produce an upconverted signal, where the second frequency is substantially an integer multiple of the first frequency.

In another aspect, the invention features an apparatus including a filtering means, which filters an input signal that has an associated first frequency. The filtering means has poles corresponding to a first filter frequency and a second filter frequency, where the two filter frequencies are different. A mixing means mixes the filtered signal with a local-oscillator signal at a second frequency to produce an upconverted signal, where the second frequency is substantially an integer multiple of the first frequency.

In one aspect, the invention features a wireless transceiver that includes a transmitter to transmit a modulated carrier signal. The transmitter includes a communications circuit, where the communications circuit includes a wideband polyphase filter that filters an input signal. The input signal has an associated first frequency, and the wideband polyphase filter has poles corresponding to a first filter frequency and a second filter frequency, where the two filter frequencies are different. The communications circuit also includes a mixer that mixes the filtered signal with a local-oscillator signal at a second frequency to produce an upconverted signal, where the second frequency is substantially an integer multiple of the first frequency.

In another aspect, the invention features a wireless transceiver that includes a transmitting means to transmit a modulated carrier signal. The transmitting means includes an upconversion means, where the upconversion means includes a filtering means that filters an input signal. The input signal has an associated first frequency, and the filtering means has poles corresponding to a first filter frequency and a second filter frequency, where the two filter frequencies are different. The upconversion means also includes a mixing means that mixes the filtered signal with a local-oscillator signal at a second frequency to produce an upconverted signal, where the second frequency is substantially an integer multiple of the first frequency.

In yet another aspect, the invention features a process for reducing spurious components in an upconverted signal, where the process includes filtering an input signal that has an associated first frequency to produce an in-phase filtered signal and a quadrature filtered signal. The quadrature filtered signal is substantially ninety degrees out of phase with the in-phase filtered signal at first and second filter frequencies, where the two filter frequencies are different. The in-phase filtered signal is mixed to a second frequency to produce an in-phase upconverted signal, where the second frequency is substantially an integer multiple of the first frequency. The quadrature filtered signal is also mixed to the second frequency to produce a quadrature upconverted signal.

Particular implementations may include one or more of the following features. The first frequency can correspond to a fundamental frequency of an intermediate-frequency local-oscillator signal. The first filter frequency can correspond to a desired signal in the input signal, and the second filter frequency can correspond to a spurious component in the input signal. The first filter frequency can be substantially equal to the first frequency, and the second filter frequency can be a non-unity integer multiple of the first frequency.

The filtered signal can include an in-phase component and a quadrature component, the local-oscillator signal can include an in-phase component and a quadrature component, and the upconverted signal can include an in-phase component and a quadrature component. The mixer can mix the in-phase component of the filtered signal with the in-phase component of the local-oscillator signal to produce the in-phase component of the upconverted signal and mix the quadrature component of the filtered signal with the quadrature component of the local-oscillator signal to produce the quadrature component of the upconverted signal. A circuit can combine the quadrature component of the upconverted signal and the in-phase component of the upconverted signal to produce an output signal.

The apparatus, system, or method can be compliant with any of IEEE standards 802.11, 802.11a, 802.11b, 802.11g, 802.11i, 802.11n, and 802.16.

In one aspect, the invention also features a wideband polyphase filter that has one or more poles corresponding to a first frequency and one or more poles corresponding to a second frequency, where the second frequency is different than the first frequency. The first frequency can correspond to a fundamental frequency of an intermediate-frequency local-oscillator signal, and the second frequency can correspond to a frequency of a spurious component.

In another aspect, the invention features a process for reducing spurious components in an upconverted signal. The process includes first mixing an input signal to a first frequency, thereby producing an intermediate signal. The intermediate signal is mixed to a second frequency, thereby producing an upconverted signal, where the second frequency is different than the first frequency. The first frequency and the second frequency are selected such that a spurious component of the intermediate signal generated in the first mixing falls, when upconverted, on a same frequency as another component in the upconverted signal. The second frequency can be selected to be an integer multiple of the first frequency.

Implementations can include one or more of the following advantages. A method, apparatus, and system are disclosed that can be used to reduce a number of spurious components in an output signal of a transmitter. Intermodulation products typically will overlap existing spurious components instead of creating new spurious components. The method, apparatus, and system can also attenuate spurious components in the output signal. The method, apparatus, and system can substantially remove critical spurious components from the output signal using internal filters and can reduce the cost and/or size of a communications transmitter or receiver.

These general and specific aspects may be implemented using an apparatus, a system, a method, or any combination of apparatus, systems, and methods.

The details of one or more implementations are set forth in the accompanying drawings and the description below. Other features and advantages will become apparent from the description, the drawings, and the claims.

BRIEF DESCRIPTION OF THE DRAWINGS

FIG. 1A is a block diagram of a system for upconverting a signal.

FIG. 1B is a graph of signals generated by mixing a baseband signal with an upconversion signal.

Like reference numbers and designations in the various drawings indicate like elements.

DETAILED DESCRIPTION

Figure 2:
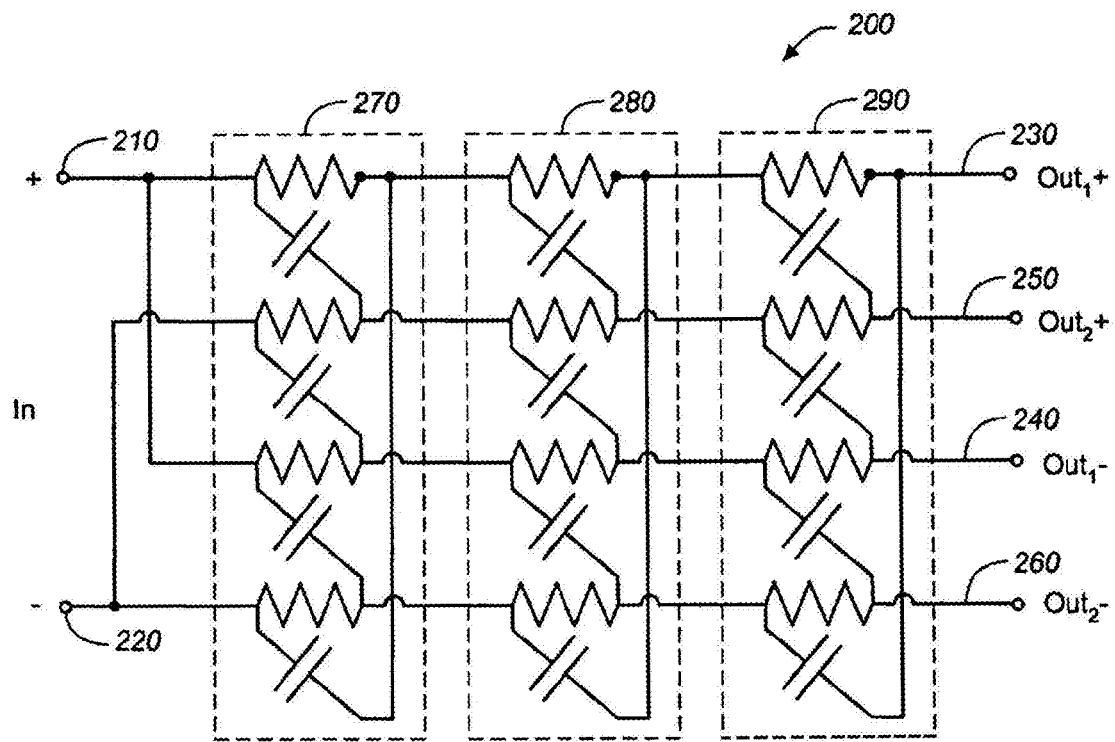
FIG. 2 is a schematic of a polyphase filter circuit.

FIG. 1A is a block diagram of a conventional system 100 that can be used to convert a baseband signal to a radio-frequency (RF) signal. An in-phase component of the baseband signal is applied to a terminal 104, and a quadrature component of the baseband signal is applied to a terminal 106. A mixer 120 mixes the in-phase component of the baseband signal with an LO signal at an intermediate frequency from a signal source 110 to create an in-phase intermediate-frequency (IF) signal 122. A mixer 125 mixes the quadrature component of the baseband signal with an LO signal at the intermediate frequency from a signal source 115 to create a quadrature IF signal 124. The LO signal from signal source 115 is at a same frequency as the LO signal from signal source 110, but is shifted in phase by ninety degrees. For example, the LO signal from signal source 110 can be of the form of a cosine wave at intermediate frequency $f_{IF}$ and the LO signal from signal source 115 can be of the form of a sine wave at $f_{IF}$. Mixers 120 and 125 will hereafter be referred to collectively as the first mixer, the in-phase and quadrature components of the baseband signal will be referred to collectively as the baseband signal, and the LO signals from signal sources 110 and 115 will be referred to collectively as the first LO signal unless otherwise noted.

The first mixer can generate spurious components (e.g., due to clock harmonics) when mixing the baseband signal with the first LO signal. Because the mixer function is approximately a square wave, the output signal will have a fundamental frequency component at the intermediate frequency and harmonics at odd integer multiples of the intermediate frequency. Referring to FIG. 1B, a frequency spectrum 105 represents the magnitude signals at the output of the first mixer. Frequency spectrum 105 includes a desired signal 172 at the intermediate frequency. Frequency spectrum 105 also includes copies 174-178 at odd harmonics of the intermediate frequency. Copies 174-178 are spurious components, since only desired signal 172 is desired to be transmitted. In some implementations, a signal at a frequency other than the fundamental frequency of the first LO signal may be the desired signal.

Referring again to FIG. 1A, the in-phase 122 and quadrature 124 IF signals are combined by an adder 130. Depending on the implementation used, adder 130 can add the in-phase and quadrature IF signals or subtract one of the IF signals from the other. A combined IF signal 132 is filtered by a highly selective bandpass filter 135 (e.g., an external SAW filter). Filter 135 reduces spurious components due to LO harmonics and leaves the desired component at the intermediate frequency. A filtered IF signal 137 from filter 135 is provided to a polyphase filter 140.

FIG. 2 illustrates a filter circuit 200 that can be used to implement polyphase filter 140 (FIG. 1A). Filter circuit 200 has differential inputs 210 and 220, differential outputs 230 and 240, and differential outputs 250 and 260. Filter circuit 200 is constructed by cascading several stages of RC-CR networks (stages 270, 280, and 290). Each of stages 270, 280, and 290 has an RC time constant corresponding to a pole of filter circuit 200. At each pole frequency of filter circuit 200, the amplitude of the output signal at differential outputs 230 and 240 is the same as the amplitude of the output signal at differential outputs 250 and 260, but the phases of the output signals are separated by ninety degrees. The pole frequencies of filter circuit 200 typically are placed close to the IF frequency of system 100 (FIG. 1A) to provide matching amplitudes and an accurate ninety degree phase separation at the intermediate frequency even when process variations occur in the R and C values of stages 270, 280, and 290. Typically, at frequencies away from the intermediate frequency the amplitudes of the output signals will not be matched or the phase difference between the output signals will deviate from ninety degrees (depending on whether the polyphase filter is driven by a current or by a voltage). A conventional implementation of a polyphase filter is therefore a narrowband structure exhibiting a ninety-degree phase separation over a relatively narrow range of frequencies.

Referring again to FIG. 1A, polyphase filter 140 outputs two signals at the intermediate frequency—one in-phase filtered signal 142 and one quadrature filtered signal 144. The quadrature filtered signal 144 is substantially ninety degrees out of phase with the in-phase filtered signal 142 at frequencies corresponding to the poles of the polyphase filter 140. The filtered signals (142, 144) from the output of polyphase filter 140 are converted to RF signals by a mixer 160 and a mixer 165. Mixer 160 mixes the in-phase filtered signal 142 with an LO signal from a signal source 150 to create an in-phase signal 162. Mixer 165 mixes the quadrature filtered signal with an LO signal from a signal source 155 to create a quadrature signal 164. The LO signals from signal sources 150 and 155 have the same frequency (f) but the signal from signal source 155 is shifted in phase by ninety degrees relative to the signal from signal source 150. For example, the LO signal from signal source 150 can be of the form of a cosine wave at $f_{RF}$, and the mixer signal from signal source 155 can be of the form of a sine wave at $f_{RF}$. Mixers 160 and 165 will hereafter be referred to collectively as the second mixer, and the LO signals from signal sources 150 and 155 will be referred to collectively as the second LO signal.

Signals 162 and 164 each contain two components—a desirable component at the carrier frequency $f=f_{RF}+f_{IF}$, and an image at $f_{RF}+f_{IF}$. Because of the phase shifts between signals 142 and 144 and between the signals from signal sources 150 and 155, the desirable components of signals 162 and 164 are out of phase with each other, and the image components of signals 162 and 164 are in phase with each other. When signal 164 is subtracted from signal 162 to produce an output signal 170, the image components cancel and only the desirable component at the carrier frequency is left. Polyphase filter 140, mixer 160, and mixer 165 form an image-rejection mixer structure.

System 100 relies on filter 135 to remove spurious components due to LO harmonics. If the spurious components are not filtered by filter 135, they can pass through the image-rejection mixer structure and reach output signal 170. In addition, because the narrow-band polyphase filter 140 typically does not produce ninety degree phase separation or matched amplitudes at the spurious component frequencies, images of the spurious components are not cancelled by the image-rejection mixer structure, resulting in spurious components in output signal 170.

Figure 3:
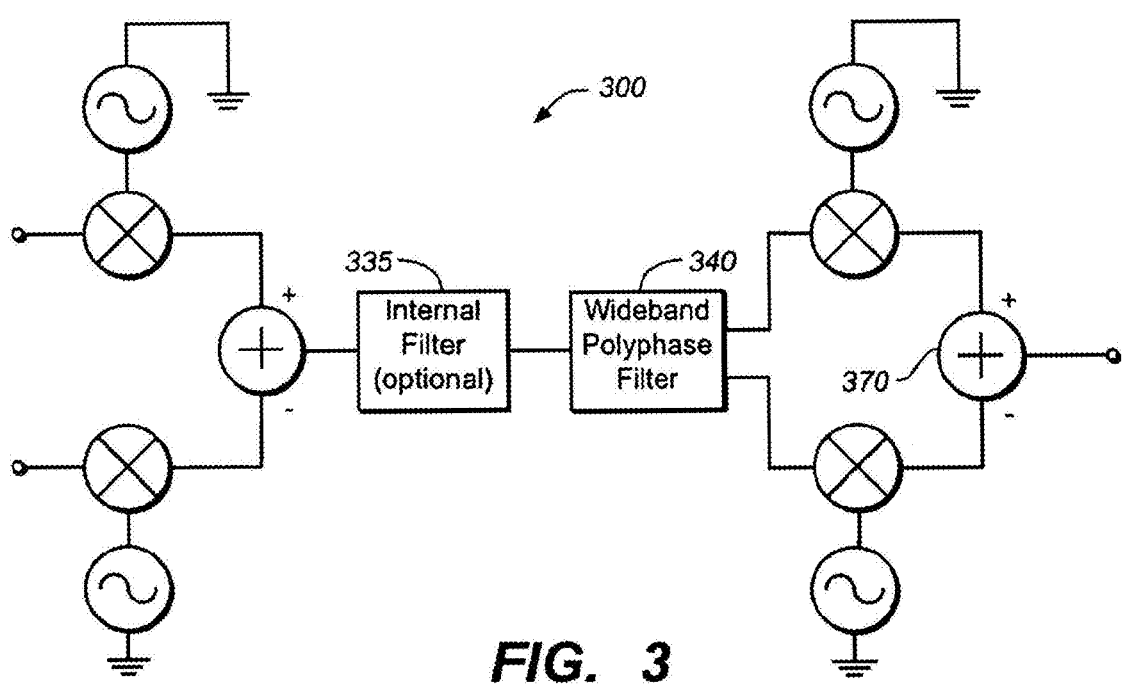
FIG. 3 is a block diagram of a system for upconverting a signal while reducing spurious components.

FIG. 3 illustrates a system 300 that can be used to substantially reduce spurious emissions without relying on an external filter. System 300 significantly reduces the number of spurious components and can selectively remove spurious components that would otherwise fall into undesirable frequency bands (e.g., restricted bands). Referring to FIG. 1A and FIG. 3, system 300 is similar to system 100, but has some important differences. For example, filter 135 (e.g., an external high-selectivity bandpass filter) is replaced by an optional internal filter 335. Filter 335 mildly attenuates spurious components due to LO harmonics and can be, for example, a low-selectivity low-pass filter.

In system 100, the intermediate frequency ($f_{IF}$) and the frequency of the second LO signal ($f_{RF}$) can be chosen independently of each other, except that the sum of the intermediate frequency and the frequency of the second LO signal should be equal to the desired channel frequency ($f_C$). The requirement that $f_{IF}+f_{RF}=f_C$ assumes that system 100 uses high-side mixing, where $f_{IF}$ is lower than $f_C$. If system 100 uses low-side mixing (where $f_{IF}$ is higher than $f_C$), the difference between the intermediate frequency and the frequency of the second LO signal should be equal to $f_C$. If the spurious components due to LO harmonics were not removed by filter 135, all of the spurious components and the associated images generated in the second mixer would typically fall on distinct frequencies, resulting in a large number of spurious components in output signal 170.

In one implementation of system 300, a fixed integer-ratio relation (hereafter referred to as a ratio-based LO frequency plan) between the frequencies of the second and first LO signals ($f_{RF}$ and $f_{IF}$) is imposed (i.e., $f_{RF}=K*f_{IF}$, and $f_C=f_{RF}+f_{IF}=(K+1)f_{IF}$, where K is a positive integer). The fixed integer-ratio reduces the number of spurious components. When there is a fixed integer-ratio relating $f_{RF}$ to $f_{IF}$, a spurious component in the output signal 370 due to the $N^{th}$ LO harmonic in the first mixer (at frequency $f_{RF}+N*f_{IF}=(K+N)*f_{IF}$) will overlap an image generated in the second mixer due to the $M^{th}$ LO harmonic of the first mixer (at frequency $|fRF-M*f_{IF}|=|K-M|*f_{IF}$) whenever $K+N=|K-M|$. The total number of spurious components in output signal 370 therefore can be reduced.

The constant ratio K is typically chosen to be a power of two (i.e., 1, 2, 4, . . . ) so that the first LO signal can be generated by dividing down the second LO signal. Therefore, only a single local oscillator is needed in system 300. Two factors to consider when choosing the value of K are the number of spurious components (which decreases with decreasing K) and whether the resulting frequency plan will generate spurious components in undesirable frequency bands.

Figure 4:
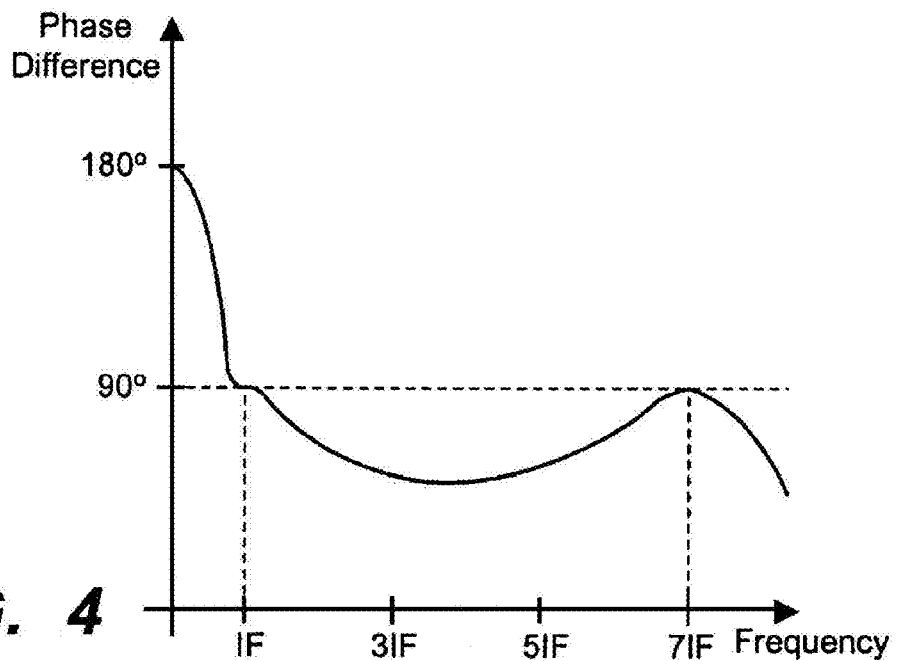
FIG. 4 is a graph of the phase difference between the in-phase and quadrature outputs of a polyphase filter.

System 300 includes a wideband polyphase filter 340, which selectively attenuates critical spurious components. A conventional implementation of a polyphase filter, as described in the context of FIG. 2, involves cascading several RC-CR networks with pole frequencies that are close to a single frequency. A wideband polyphase filter includes one or more additional RC-CR sections with poles away from the primary pole location. By placing one or more secondary poles at frequencies of critical spurious components, the amplitude matching and phase splitting properties of the polyphase filter can function at one or more spurious component frequencies, which sharply attenuates corresponding spurious component images in output signal 370. FIG. 4 shows the phase response of wideband polyphase filter 340.

In principle, any spurious component image that is located at a frequency lower than the carrier frequency can be removed in a high-side mixing system using the ratio-based LO frequency plan (discussed above in reference to system 300) by strategically placing a secondary pole in the wideband polyphase filter. For example, if an LO frequency ratio K of four is chosen, $f_{IF}=2.4$ GHz/5=480 MHz, $f_{RF}=4*f_{IF}=1.92$ GHz, the desired output signal is at 2.4 GHz ($=f_{RF}+f_{IF}$), and spurious components can occur at frequencies N*480 MHz, where N is any integer. If the spurious component located at 3*480 MHz=1.44 GHz falls in a restricted band, the spurious component should be maximally attenuated. The spurious component at 1.44 GHz originates from two sources: an image of the desired signal generated in the second mixer (since $|f_{RF}-f_{IF}|=4-1|*480$ MHz=1.44 GHz), and an image generated in the second mixer due to the $7^{th}$ LO harmonic of the first mixer (since $|f_{RF}-7*f_{IF}|=|4-7|*480$ MHz=1.44 GHz). The former image is rejected by the image-rejection mixer structure, since the primary poles of wideband polyphase filter 340 are placed around $f_{IF}$. The latter image can be attenuated if a secondary pole of wideband polyphase filter 340 is placed at the frequency of the $7^{th}$ LO harmonic (3.36 GHz).

Figure 5:
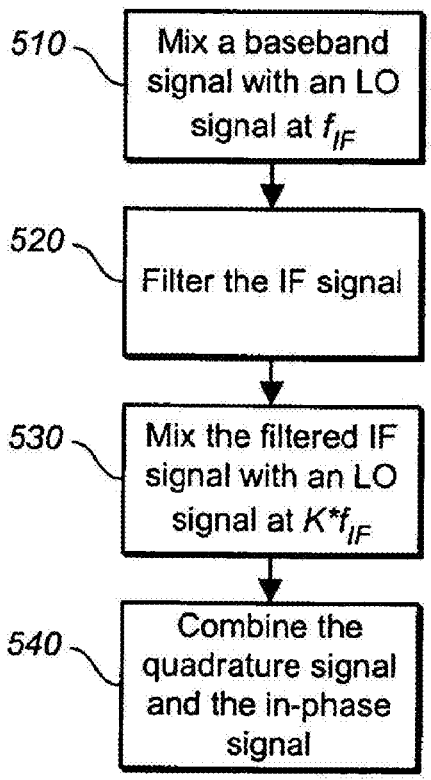
FIG. 5 is a flowchart of a process to reduce spurious components in a transmitter.

Referring to FIG. 5, a process is shown whereby a baseband signal can be converted to an RF signal. A baseband signal is mixed with an LO signal at an intermediate frequency $f_{IF}$ (step 510) to produce an IF signal. The IF signal may contain spurious components at integer multiples of $f_{IF}$. The IF signal is filtered with a wideband polyphase filter (step 520). The wideband polyphase filter has at least one pole at the intermediate frequency and at least one pole at a frequency that corresponds to a spurious component. The wideband polyphase filter outputs an in-phase filtered signal and a quadrature filtered signal. The quadrature filtered signal is substantially ninety degrees out of phase from the in-phase filtered signal at the intermediate frequency and at the frequency of the pole corresponding to the spurious component.

In step 530, an in-phase signal is produced by mixing the in-phase filtered signal with an in-phase LO signal at a radio frequency that is an integer multiple of the intermediate frequency. A quadrature signal is produced by mixing the quadrature filtered signal with a quadrature LO signal at the radio frequency, where the quadrature LO signal is substantially ninety degrees out of phase with the in-phase LO signal.

The quadrature signal produced in step 530 is combined with the in-phase signal produced in step 530 (step 540). For example, the quadrature signal can be subtracted from the in-phase signal. The combining removes images from the resulting signal that correspond to the frequencies in the IF signal at which poles are located. For example, if one or more poles of the wideband polyphase filter are located at the intermediate frequency and one or more poles are located at seven times the intermediate frequency when the radio frequency is four times the intermediate frequency, the images in the signal output from step 540 at three times the intermediate frequency will be removed. The image at three times the intermediate frequency can be removed by placing a pole at the intermediate frequency, and the other image that falls on three times the intermediate frequency can be removed by placing a pole at seven times the intermediate frequency.

Figure 6:
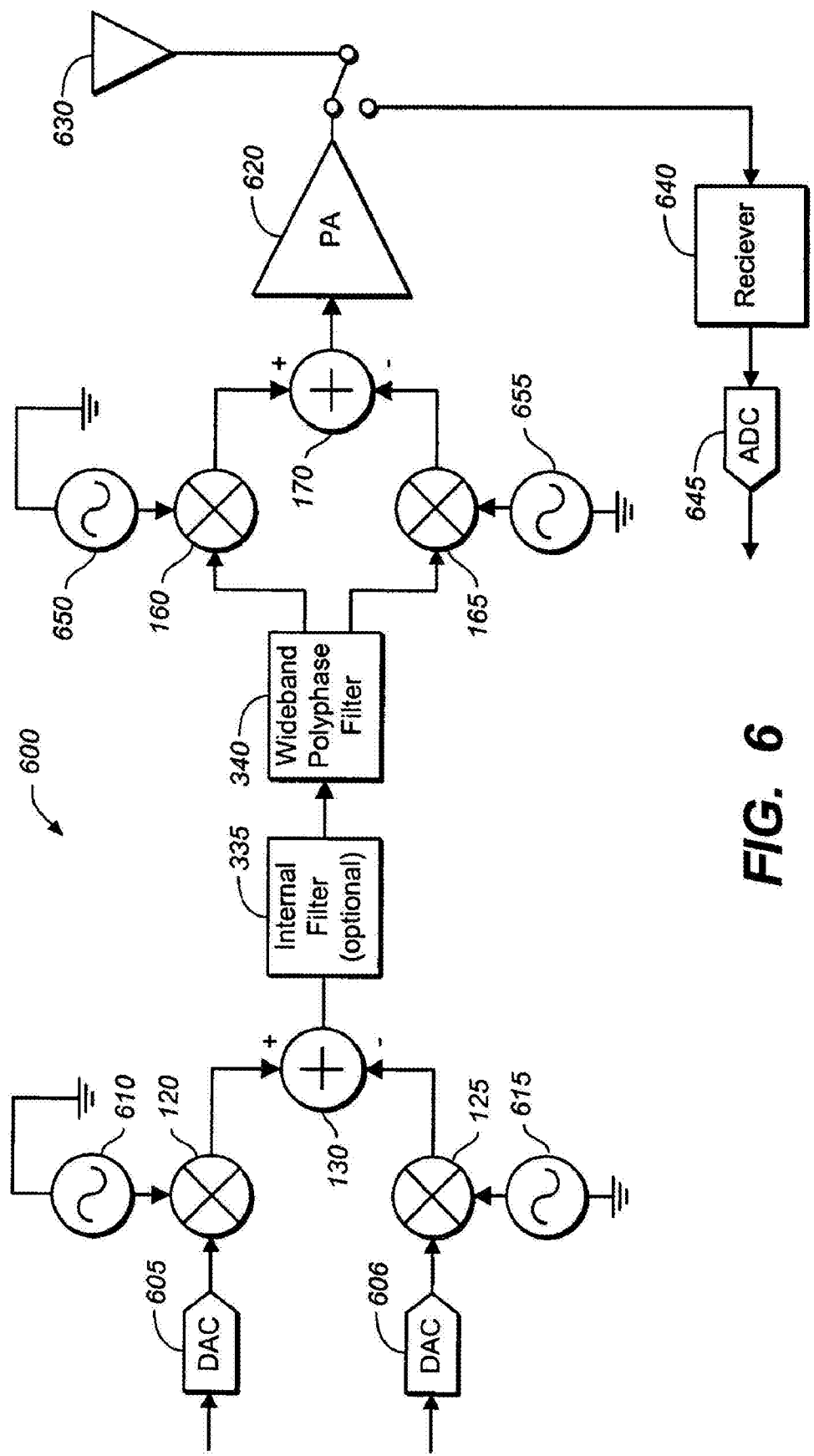
FIG. 6 is a block diagram of a wireless transceiver.

The described spurious component reduction system and method can be used in a wide range of applications. Referring to FIG. 6, the system and method can be used in a wireless transceiver 600 (hereafter referred to as transceiver 600). The transmit path of transceiver 600 includes digital-to-analog converters (DACs) 605 and 606 that supply in-phase and quadrature components of a baseband signal to a mixer 120 and a mixer 125 respectively. Mixer 120 modulates a signal generated by a signal source 610 with the in-phase baseband signal and mixer 125 modulates a signal generated by a signal source 615 with the quadrature baseband signal, where the signal generated by signal source 615 is substantially ninety degrees out of phase with the signal generated by signal source 610 and at the same frequency (the intermediate frequency). The in-phase and quadrature modulated signals are combined in an adder 130 and the combined signal is optionally filtered by a lowpass filter 335 to attenuate spurious components in the combined signal.

The filtered signal is filtered by a wideband polyphase filter 340 to produce an in-phase filtered signal and a quadrature filtered signal. Wideband polyphase filter 340 has poles corresponding to the frequency of the signal generated by signal source 610 and corresponding to the frequency of a spurious component in the filtered signal. A mixer 160 modulates the in-phase filtered signal with a signal generated by a signal source 650 to produce an in-phase RF signal. A mixer 165 modulates the quadrature filtered signal with a signal generated by a signal source 655 to produce a quadrature RF signal. The signal generated by signal source 655 is substantially ninety degrees out of phase with the signal generated by signal source 650. In one implementation, the signals generated by signal sources 650 and 655 are both at a frequency that is an integer multiple of the intermediate frequency. An adder 170 subtracts the quadrature RF signal from the in-phase RF signal to attenuate images in the RF signal. An amplifier 620 amplifies the RF signal and transmits the RF signal using an antenna 630.

The receive path of transceiver 600 includes a receiver 640 and an analog-to-digital converter 645. Transceiver 600 can be IEEE 802 compliant with the following standards: 802.11, 802.11a, 802.11b, 802.11g, 802.11i, 802.11n, and 802.16.

This application describes a method, apparatus, and system that can be used to reduce spurious emission from a transmitter without relying on external filters. The method, apparatus, and system can include one or both of the following aspects: first, a ratio-based LO frequency plan can be used to reduce the total number of spurious components generated; second, a wide-band polyphase filter can be employed to selectively remove critical spurious components around the carrier frequency. Various implementations have been described. These and other implementations are within the scope of the following claims. For example, the method, apparatus, and system described above can be used with different transceiver architectures. The polyphase filter in the method, apparatus, and system can also include multiple poles at multiple frequencies corresponding to multiple spurious components.

What is claimed is:

1. A method comprising:
   identifying, at a transmitter, a first frequency and a second frequency;
   establishing a relationship between the first frequency and the second frequency;
   mixing an input signal with the first frequency to generate a first frequency signal;
   filtering the first frequency signal using at least one pole at a frequency that corresponds to an undesired component associated with the first frequency signal to generate a filtered signal; and
   mixing the filtered signal with the second frequency based on the established relationship to generate an output signal.

2. The method of claim 1, where establishing the relationship includes establishing a ratio between the first frequency and the second frequency; and
   where mixing the filtered signal includes mixing the filtered signal with the second frequency based on the ratio.

3. The method of claim 2, where establishing the ratio includes selecting a ratio value that allows the undesired component associated with the first frequency signal to fall on a same frequency as an image component in the output signal.

4. The method of claim 3, where the ratio value is a power of two.

5. The method of claim 3, where selecting the ratio value includes selecting a frequency value for the second frequency that is a power of two of the first frequency.

6. The method of claim 1, where filtering the first frequency signal includes:
   using a first filtered frequency corresponding to a desired component associated with the first frequency signal to generate a first filtered signal, and a second filtered frequency corresponding to the undesired component associated with the first frequency signal to generate a second filtered signal.

7. The method of claim 6, where filtering the first frequency signal includes filtering the first frequency signal using a first filtering process and a second filtering process;
   where using the first filtering process includes using one or more primary poles corresponding to the desired component; and
   where using the second filtering process includes using one or more secondary poles corresponding to the undesired component.

8. The method of claim 6, where mixing the filtered signal includes:
   mixing an in-phase filtered signal and a quadrature filtered signal with the second frequency based on the established relationship to generate an in-phase upconverted signal and a quadrature upconverted signal.

9. The method of claim 8, further comprising:
combining the in-phase upconverted signal and the quadrature upconverted signal to generate a combined output as the output signal.

10. The method of claim 9, where combining the in-phase upconverted signal and the quadrature upconverted signal includes:
subtracting the quadrature upconverted signal from the in-phase upconverted signal to remove the undesired component.

11. The method of claim 8, where the in-phase filtered signal and the quadrature filtered signal are out of phase at the first frequency and the second frequency.

12. The method of claim 6, where filtering the first frequency signal further includes: filtering the first frequency signal based on one or more additional frequencies different from the first filtered frequency and the second filtered frequency, each additional frequency corresponding to an additional undesired component in the first frequency signal.

13. A device comprising:
a first mixer to receive a baseband signal and to mix the baseband signal with an intermediate frequency to generate an intermediate frequency signal;
a filter having one or more first poles at the intermediate frequency and one or more second poles at a frequency corresponding to an undesired component of the intermediate frequency signal, the filter configured to filter the intermediate frequency signal using the one or more first poles and the one or more second poles to produce a filtered signal; and
a second mixer to mix the filtered signal with a predetermined frequency to provide an output signal, the predetermined frequency being an integer multiple of the intermediate frequency.

14. The device of claim 13, further comprising a digital-to-analog converting stage to receive the baseband signal and to provide an analog baseband signal to the first mixer,
where the first mixer receives the analog baseband signal from the digital-to-analog converting stage, and mixes the analog baseband signal with the intermediate frequency; and
where the output signal is output to an amplifier for amplification before transmission.

* * * * *